United States Patent
Verdegan et al.

(10) Patent No.: US 7,754,123 B2
(45) Date of Patent: Jul. 13, 2010

(54) HIGH PERFORMANCE FILTER MEDIA WITH INTERNAL NANOFIBER STRUCTURE AND MANUFACTURING METHODOLOGY

(75) Inventors: Barry M. Verdegan, Stoughton, WI (US); Stephen L. Fallon, Madison, WI (US); Byron A. Pardue, Cookeville, TN (US); William C. Haberkamp, Cookeville, TN (US)

(73) Assignee: Fleetguard, Inc., Nashville, TN (US)

( * ) Notice: Subject to any disclaimer, the term of this patent is extended or adjusted under 35 U.S.C. 154(b) by 994 days.

(21) Appl. No.: 11/508,759

(22) Filed: Aug. 23, 2006

(65) Prior Publication Data

US 2007/0021021 A1 Jan. 25, 2007

Related U.S. Application Data

(62) Division of application No. 10/630,520, filed on Jul. 30, 2003, now abandoned.

(51) Int. Cl.
*B27N 3/04* (2006.01)

(52) U.S. Cl. .................. 264/122; 264/DIG. 48; 428/903

(58) Field of Classification Search ........ None
See application file for complete search history.

(56) References Cited

U.S. PATENT DOCUMENTS

| | | | |
|---|---|---|---|
| 3,073,735 A | 1/1963 | Till et al. | |
| 4,011,067 A | 3/1977 | Carey, Jr. | |
| 4,119,543 A | 10/1978 | Lawson et al. | |
| 4,143,196 A | 3/1979 | Simm et al. | |
| 4,650,506 A | 3/1987 | Barris et al. | |
| 5,350,620 A * | 9/1994 | Sundet et al. | 428/172 |
| 5,634,954 A | 6/1997 | Kern | |
| 5,670,247 A | 9/1997 | Takaoka et al. | |
| 5,785,725 A | 7/1998 | Cusick et al. | |
| 5,800,706 A | 9/1998 | Fischer | |
| 5,993,501 A | 11/1999 | Cusick et al. | |
| 6,155,432 A | 12/2000 | Wilson et al. | |
| 6,230,901 B1 * | 5/2001 | Ogata et al. | 210/496 |
| 6,248,267 B1 | 6/2001 | Hosako et al. | |
| 6,315,806 B1 | 11/2001 | Torobin et al. | |
| 6,428,610 B1 | 8/2002 | Tsai et al. | |
| 6,521,321 B2 | 2/2003 | Kahlbaugh et al. | |
| 6,554,881 B1 * | 4/2003 | Healey | 55/528 |

(Continued)

FOREIGN PATENT DOCUMENTS

| | | |
|---|---|---|
| WO | WO-02/068734 | 9/2002 |
| WO | WO-03/000407 | 1/2003 |

OTHER PUBLICATIONS http://doultonusa.com/HTML%20pages/Technology.htm, Daulton USA.

(Continued)

*Primary Examiner*—Mary Lynn F Theisen
(74) *Attorney, Agent, or Firm*—Andrus, Sceales, Starke & Sawall, LLP; J. Bruce Schelkopf

(57) ABSTRACT

High performance filter media and manufacturing methodology provides nanofibers of diameter less than 1 μm incorporated and processed into internal structure of a filter medium dominantly composed of coarse fibers of diameter greater than 1 μm, to change the internal media structure.

26 Claims, 8 Drawing Sheets

U.S. PATENT DOCUMENTS

| | | | |
|---|---|---|---|
| 6,579,350 B2 | 6/2003 | Doherty | |
| 6,616,723 B2 * | 9/2003 | Berger | 55/527 |
| 6,743,273 B2 | 6/2004 | Chung et al. | |
| 2002/0046656 A1 | 4/2002 | Benson et al. | |
| 2002/0092423 A1 | 7/2002 | Gillingham et al. | |
| 2002/0192468 A1 | 12/2002 | Choi | |

OTHER PUBLICATIONS

"*Advances in Sub-Micron Fiber Production*", John Hagewood, Arnold Wilkie, NonWoven World, Apr.-May 2003, pp. 69-73.

"*The microfiber business in Japan*", Max Golding, Technical Textiles International, May 1992, pp. 18-23, Elsevier Scidence Publishers 1992.

* cited by examiner

MACROSTRUCTURE A

MACROSTRUCTURE B

MACROSTRUCTURE C

MICROSTRUCTURE 1

MICROSTRUCTURE 2

MICROSTRUCTURE 3

TEST MEDIA A

TEST MEDIA C

TEST MEDIA D

TEST MEDIA E

FIG. 8

TABLE 1. CHARACTERISTICS OF SAMPLE FILTER MEDIA

| MEDIA | | | A | B | C | D | E | G | H | I | J | K | COMMERCIAL FUEL FILTER-GRADE CELLULOSE CF |
|---|---|---|---|---|---|---|---|---|---|---|---|---|---|
| MEDIA RECIPE | | UNITS | | | | | | | | | | | |
| CRESTBROOK BLEACHED NORTHERN PINE PULP | AMOUNT | g | 4 | 4 | 3.5 | 4 | 4 | 5.5 | 5.5 | 5.5 | 5.5 | 6 | |
| BUCKEYE CELLULOSE HP2 | AMOUNT | g | 3 | 2.75 | 2.5 | 3 | 2.75 | 6 | 6 | 5.5 | 5.5 | 6 | |
| OTHER | | | NONE | POLYESTER MELTBLOWN | POLY. MELTB. | ACRYLIC NANOFIBER | 706 GLASS | 706 GLASS | FIBRILLATED KEVLAR | FIBR. KEV. | POLY. MELTB. | NANOFIBER POLYARAMID | |
| | AMOUNT | g | 0.00 | 0.25 | 1.00 | 0.03 | 0.25 | 0.50 | 0.50 | 1.00 | 0.80 | 0.06 | |
| | DIAMETER | mm | NA | 1400-3300 | 1400-3300 | 100-500 | 800 | 800 | 500-4000 | 500-4000 | 1400-3300 | 200-600 | |
| MACROSTRUCTURE | | | NA | B | B | B | B | A | B | B | B | B | |
| MICROSTRUCTURE | | | NA | 1 | 1 | 1 | 1 | 1 | 1 | 1 | 1 | 2 | |
| PHYSICAL PROPERTIES | | | | | | | | | | | | | |
| | BASIS WEIGHT | g/m2 | 83.71 | 83.10 | 79.11 | 81.48 | 75.77 | 127.32 | 125.66 | 126.77 | 130.64 | 132.86 | 138.00 |
| | CALIPER | mm | 0.36 | 0.32 | 0.33 | 0.33 | 0.36 | 0.64 | 0.69 | 0.64 | 0.64 | 0.61 | 0.55 |
| | FRAZIER PERMEABILITY | fpm at 0.5 in.H2O | 40.3 | 27.4 | 15.2 | 10.0 | 12.4 | 14.5 | 29.0 | 19.0 | 23.0 | 25.0 | 17.0 |
| | MEAN FLOW PORE SIZE | μm | 19.5 | 17.7 | 12.3 | 9.5 | 10.5 | 12.3 | 18.5 | 13.4 | 16.1 | 16.7 | 12.40 |
| FRACTIONAL EFFICIENCY | PARTICLE SIZE (μm) | | | | | | | | | | | | |
| | 0.22 | % | 14.996 | 23.496 | 38.637 | 43.337 | 48.708 | | | | | | |
| | 0.28 | % | 17.249 | 24.707 | 43.127 | 45.867 | 54.790 | | | | | | |
| | 0.34 | % | 12.496 | 23.819 | 43.927 | 49.016 | 54.514 | | | | | | |
| | 0.43 | % | 18.195 | 25.127 | 47.540 | 53.471 | 61.539 | | | | | | |
| | 0.52 | % | 23.007 | 29.511 | 48.984 | 53.328 | 64.315 | | | | | | |
| | 0.65 | % | 25.027 | 37.623 | 58.792 | 60.300 | 72.688 | | | | | | |
| | 0.81 | % | 27.788 | 37.880 | 65.118 | 67.718 | 80.582 | | | | | | |
| | 1.00 | % | 21.209 | 45.067 | 71.291 | 72.142 | 86.051 | | | | | | |
| | 1.25 | % | 29.001 | 44.470 | 75.180 | 76.745 | 88.305 | | | | | | |
| | 1.55 | % | 38.515 | 54.229 | 81.989 | 82.660 | 90.714 | | | | | | |
| | 1.91 | % | 46.390 | 55.384 | 80.603 | 84.540 | 93.030 | | | | | | |
| | 2.38 | % | 48.808 | 63.993 | 87.978 | 89.499 | 95.582 | | | | | | |
| | 2.95 | % | 58.414 | 71.177 | 92.577 | 92.467 | 97.164 | | | | | | |
| | 3.64 | % | 67.462 | 81.837 | 96.139 | 94.443 | 98.082 | | | | | | |
| | 4.52 | % | 84.792 | 89.938 | 99.047 | 97.490 | 99.350 | | | | | | |

TEST MEDIA G

TEST MEDIA I

TEST MEDIA J

TEST MEDIA K

COMMERCIAL FUEL
GRADE CELLULOSE MEDIA CF
PRIOR ART

- NO SECONDARY NANO- OR MICROFIBERS
- ▲ MIXED NANO- AND MICROFIBER AS SECONDARY FIBER COMPONENT, MICROSTRUCTURE 1
- ■ NANOFIBERS AS SECONDARY FIBER COMPONENT, MICROSTRUCTURE 1
- ✱ NANOFIBERS AS SECONDARY FIBER COMPONENT, MICROSTRUCTURE 2

- ● NO SECONDARY NANO- OR MICROFIBERS
- ▲ MIXED NANO- AND MICROFIBER AS SECONDARY FIBER COMPONENT, MICROSTRUCTURE 1
- ■ NANOFIBERS AS SECONDARY FIBER COMPONENT, MICROSTRUCTURE 1
- ✱ NANOFIBERS AS SECONDARY FIBER COMPONENT, MICROSTRUCTURE 2

US 7,754,123 B2

HIGH PERFORMANCE FILTER MEDIA WITH INTERNAL NANOFIBER STRUCTURE AND MANUFACTURING METHODOLOGY

CROSS REFERENCE TO RELATED APPLICATION

This application is a division of U.S. patent application Ser. No. 10/630,520, filed Jul. 30, 2003 now abandoned.

BACKGROUND AND SUMMARY OF THE INVENTION

The invention relates to filter media, and more particularly to filter media incorporating nanofibers of diameter less than 1 μm for high performance.

Filter media with nanofibers is known in the prior art. A nanofiber filter media layer is typically provided along an upstream face surface of a bulk filter media including a layer of coarse fibers. The nanofibers extend parallel to the face of the bulk filter media layer and provide high efficiency filtering of small particles in addition to the filtering of larger particles provided by the coarse filter media. The nanofibers are provided in a thin layer laid down on a supporting substrate and/or used in conjunction with protective layers in order to attain a variety of benefits, including increased efficiency, reduced initial pressure drop, cleanability, reduced filter media thickness and/or to provide an impermeability barrier to certain fluids, such as water droplets. Prior approaches have several inherent disadvantages, including the need for a supporting substrate, a risk of delamination of the nanofiber layer from the substrate, more rapid plugging of the filter by captured contaminants, and the alignment of nanofibers parallel to the media face surface.

Also known in the prior art are filter media having cellulose coarse fibers and a mixture of glass nanofibers and microfibers in the media. These filters use stiff glass nanofibers, and use polymeric microfibers to strengthen the media. They have been used in fuel, air and hydraulic filters.

The present invention addresses and solves the above noted problems. The invention provides a fibrous filter media with nanofibers incorporated and processed into internal structure of a filter medium. The invention may be used in a variety of applications for filtering fluid, including gas such as air, exhaust, and crankcase ventilation gas, and including liquid such as oil, fuel, coolant, water, and hydraulic fluid.

BRIEF DESCRIPTION OF THE DRAWINGS

FIG. 8 is a Table of filter media characteristics.

DETAILED DESCRIPTION

Figure 1:
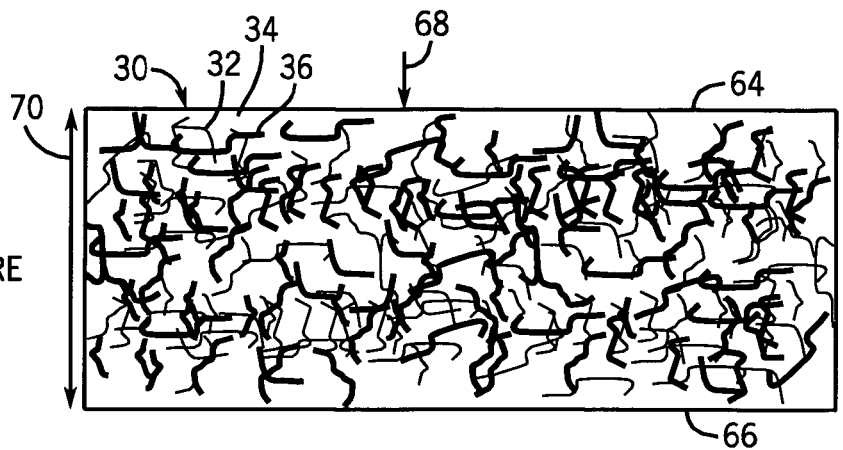
FIG. 1 is a schematic macrostructure illustration of filter media in accordance with the invention.

FIG. 1 shows high performance filter media 30 having nanofibers 32 of diameter less than 1 μm incorporated and processed into internal structure of a filter medium 34 dominantly composed of coarse fibers 36 of diameter greater than 1 μm. In some embodiments, to be described, nanofibers 32 and coarse fibers 36 are of different materials. Nanofibers 32 are preferably selected from the group consisting of: polymeric materials; ceramic materials; acrylic; nylon; polyvinyl alcohol; polymeric halocarbon; polyester; polyaramid; polyphenylsulfide; cellulose; titania; glass; alumina; and silica. Coarse fibers 36 are preferably selected from the group consisting of: polymeric materials; ceramic materials; polyvinyl alcohol; cellulose; acrylic; polyester; polyaramid; titania; glass; silica; nylon; polyphenylsulfide; polymeric halocarbon; and alumina. The ratio of coarse fiber diameter to nanofiber diameter is between 10 and 1,000. In some embodiments, particularly for liquids, the nanofibers have a diameter preferably less than 500 nm, and greater than 50 nm. In further embodiments, particularly for air filtration, smaller diameter nanofibers may be preferred. The nanofibers preferably comprise less than 5% by weight of the weight of filter media 30, and further preferably less than 1% by weight of the weight of the filter media 30. In the embodiment of FIG. 1, nanofibers 32 are distributed uniformly throughout filter media 30.

Figure 2:
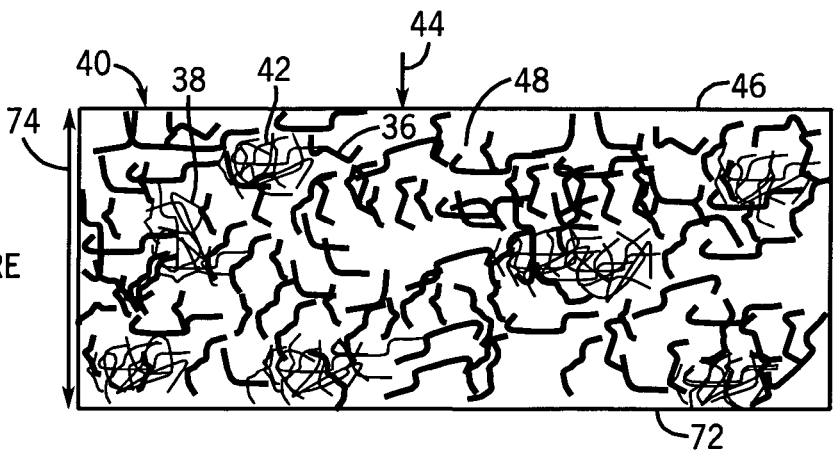
FIG. 2 is like FIG. 1 and shows another embodiment.

In another embodiment, FIG. 2, nanofibers 38 are distributed unevenly in filter media 40 such that nanofibers 38 are concentrated in bundles 42 providing pockets of nanofibers in a matrix of coarse fibers 36. The bundles or pockets 42 provide spatially distinct areas of greater filtration efficiency in a matrix of lesser filtration efficiency. The nanofibers are provided in low enough concentration and small enough diameter, to be described, that there is insubstantial difference in flow velocity, relative to media without nanofibers, as shown at arrow 44 through media 40 across face 46 normal thereto, until nanofiber bundles 42 begin to plug, whereupon flow is increasingly diverted through coarse fiber sections 48 in the matrix between the pockets, to provide a net effect of overall higher efficiency than filter media composed only of coarse fibers, and longer life than high efficiency filters of higher concentration nanofibers. Filtration efficiency is increased relative to media without nanofibers at the same flow velocity and pressure drop, at least initially until nanofiber bundles 42 begin to plug.

Figure 3:
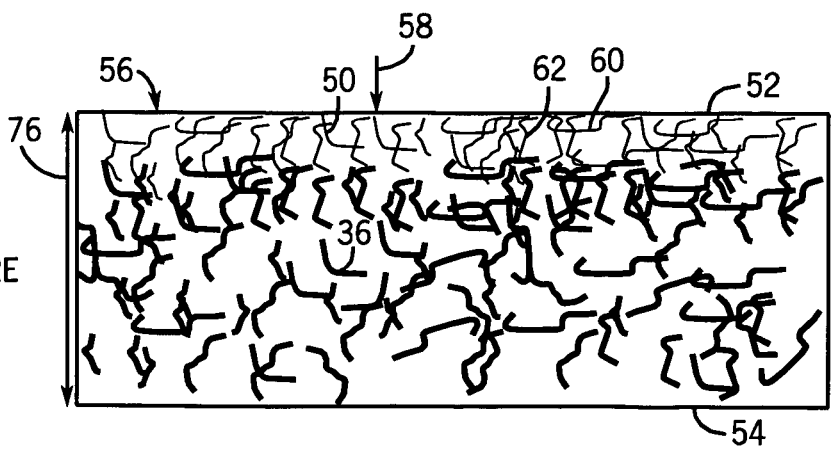
FIG. 3 is like FIG. 1 and shows another embodiment.

In a further embodiment, FIG. 3, nanofibers 50 are concentrated at and distributed across one of the upstream and downstream faces 52 and 54, preferably upstream face 52, of filter media 56. Distally opposite upstream and downstream faces 52 and 54 are normal to the flow through filter media 56 as shown at flow arrow 58. The nanofibers include a first set of nanofibers 60 extending substantially parallel to face 52, and a second set of nanofibers 62 extending substantially normal to face 52. Nanofibers 60 and 62 may be separate distinct nanofibers or may be the same nanofiber having differently oriented segments joined at a bend.

In each of the noted embodiments, the coarse fibers structurally support the nanofibers, without a separate supporting substrate for the nanofibers. Depending upon application and media thickness, a supporting substrate may be provided for the coarse fibers.

Filter media 30, FIG. 1, has distally opposite upstream and downstream faces 64 and 66 normal to flow therethrough, as shown at flow arrow 68, and defining a filter media thickness 70 therebetween. Filter media 40, FIG. 2, has distally opposite upstream and downstream faces 46 and 72 normal to flow therethrough, as shown at flow arrow 44, and defining a filter media thickness 74 therebetween. Filter media 56, FIG. 3, has distally opposite upstream and downstream faces 52 and 54 normal to flow therethrough, as shown at flow arrow 58, and defining a filter media thickness 76 therebetween. Each of the filter medias has a macrostructure, to be described, defined as viewed at magnification of 5 to 50×, namely: filter media 30, FIG. 1, has a macrostructure A wherein nanofibers 32 are distributed uniformly throughout the filter media; filter media 40, FIG. 2, has a macrostructure B wherein nanofibers 38 are distributed unevenly in bundles 42 providing pockets of nanofibers in a matrix of coarse fibers 36; and filter media 56, FIG. 3, has a macrostructure C wherein nanofibers 50 are concentrated near one of the faces 52 and 54, preferably face 52, in three-dimensionally spatially random orientations. Each filter media 30, 40, 56 also has a nanofiber/coarse fiber interface providing a microstructure, to be described, defined as viewed at magnification of 50 to 500×, namely: a microstructure 1, FIG. 4, wherein nanofibers 32 form bridges 78 across pores 80 between coarse fibers 36; a microstructure 2, FIG. 5, wherein nanofibers 82 substantially collapse onto coarse fibers 36; and a microstructure 3, FIG. 6, wherein pockets 84 of nanofibers 86 have no significant bridging (FIG. 4) nor collapse (FIG. 5) of the nanofibers 86 onto the coarse fibers 36 because pockets 84 contain only nanofibers 86 clumped together and typically looped or folded onto each other. In various embodiments, to be described, the filter media is composed of combinations of: macrostructure A and microstructure 1; macrostructure A and microstructure 2; macrostructure A and microstructure 3; macrostructure B and microstructure 1; macrostructure B and microstructure 2; macrostructure B and microstructure 3; macrostructure C and microstructure 1; macrostructure C and microstructure 2; macrostructure C and microstructure 3.

In macrostructure A, FIG. 1, it is preferred that the nanofibers are distributed uniformly throughout the filter media in all three dimensions, i.e. first and second lateral dimensions parallel to faces 64 and 66, namely into and out of the page and left-right as viewed in FIG. 1, and the third dimension namely vertically in FIG. 1 parallel to arrow 68.

In macrostructure B, FIG. 2, it is preferred that each bundle 42 comprises one or more nanofibers 38, relatively short, preferably less than 1 cm, and twisted and intermingled into a knot, typically loose, or assemblage. The longest dimension of the bundle is preferably less than filter media thickness, and further preferably in the range of 10% to 50% of filter media thickness 74. It is preferred that bundles 42 cumulatively occupy less than 20% of the volume of filter media 40.

In macrostructure C, FIG. 3, it is preferred that nanofibers 50 are three-dimensionally-randomly oriented at face 52 such that some nanofiber portions at 60 extend parallel to face 52, and some nanofiber portions at 62 extend normal to face 52, such that the normally extending nanofiber portions increase attachment strength to the coarse fibers, reduce delamination risk of the nanofibers, and reduce pressure drop due to increased orientation of nanofibers in the direction of flow 58.

Figure 4:
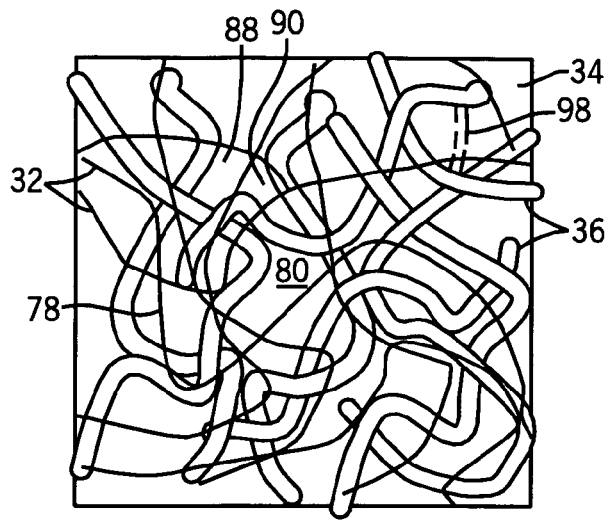
FIG. 4 is a schematic microstructure illustration of filter media in accordance with the invention.

In microstructure 1, FIG. 4, it is preferred that the nanofibers forming bridges 78 across pores 80 subdivide the pores into subpores such as 88 and 90 having a size dependent upon the relative numbers of nanofibers 32 and coarse fibers 36.

Figure 5:
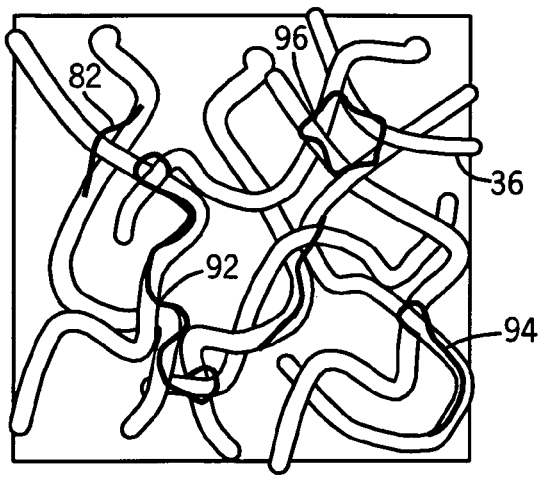
FIG. 5 is like FIG. 4 and shows another embodiment.

In microstructure 2, FIG. 5, it is preferred that the interface 92 of nanofibers 82 and coarse fibers 36 form a composite fiber 94, with the nanofibers 82 lying along and across the coarse fibers 36 and creating channels for transport and drainage, and providing an artificially roughened collection surface with increased surface area relative to coarse fibers alone, and providing strengthened bonding among fibers in the matrix increasing media strength.

Figure 6:
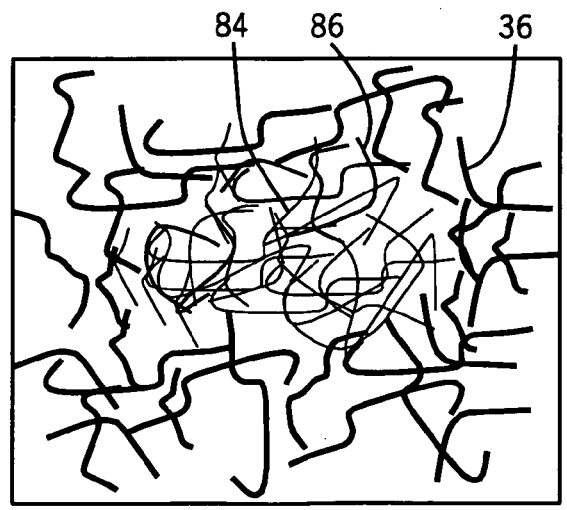
FIG. 6 is like FIG. 4 and shows another embodiment.

In microstructure 3, FIG. 6, flexible non-glass nanofibers 86 may not have sufficient strength to support themselves, and hence may collapse onto themselves, in which case the media may have less desirability for particulate filtration applications, but would have desirable application for increased surface area for adsorption filtration applications, or as a means to wick droplets away from coarser fibers, e.g. in coalescer filtration applications.

In a further embodiment, the nanofibers have different triboelectric properties than the coarse fibers to provide a triboelectric effect for removing particles from a fluid to be filtered. The nanofibers and coarse fibers are provided by first and second fiber types, respectively, preferably of different materials far enough apart in the triboelectric series to produce a charge when used together. One of the first and second fiber types is selected from the group consisting of: nylon; polyaramid; and cellulose. The other of the first and second fiber types is selected from the group consisting of: acrylic; polyester; polypropylene; and polymeric halocarbon. In another embodiment, the nanofibers have different adsorption properties than the coarse fibers. In another embodiment, the nanofibers have different surface charge characteristics than the coarse fibers. The different surface charge characteristics provide a localized electric field gradient within the filter media enhancing particle removal from fluid to be filtered. In another embodiment, the nanofibers and coarse fibers have different wettability. For example, in a fuel water separation application, the filter media captures droplets dispersed in a liquid to be filtered, e.g. water droplets from fuel in a fuel/water coalescer, wherein the nanofibers are preferentially wetted by the droplets, and the coarse fibers are preferentially non-wetted by the droplets, whereby to create a capillary pressure gradient wicking droplets off the coarse fibers, lowering pressure drop and facilitating separation and drainage. In another example, including coalescer applications, the filter media captures and coalesces droplets from a liquid to be filtered, wherein the nanofibers are preferentially non-wetted by the droplets, and the coarse fibers are preferentially wetted by the droplets, whereby to create a capillary pressure gradient wicking droplets off the nanofibers, lowering pressure drop, and facilitating coalescence and drainage. In microstructures 1, 2 and 3, desirable applications include providing the nanofibers of adsorptive or catalytic materials to increase and provide high surface area adsorptive or catalytic activity without a substantial increase in restriction. Microstructures 2 and 3 are also desirable for increased bonding of the nanofibers to the coarse fibers and provide increased strength of the filter media and provide better retention of the nanofibers and the coarse fibers than possible with nanoparticulates or nanopowders attached with adhesive or binder. In further desirable applications, including microstructures 1, 2, 3, the nanofibers are composed of material selected from the group consisting of catalytic materials, reactive materials, and adsorptive materials.

In the present invention, nanofibers, namely fibers having a diameter less than 1 μm, are incorporated into the structure of filter media dominantly composed of coarser fibers larger than 1 μm, prepared by a wet-laid process (the nanofibers and coarse fibers can be mixed/blended together and wet-laid), vacuum-forming, hydro-entanglement, or other processes. On a mass basis, the nanofibers represent less than 5% by weight of the total media weight, and preferably are present at less than 1% of the weight. As noted above, the ratio of coarse fiber diameter to nanofiber diameter is preferably between 10 and 5,000. The wettability characteristics of the fibers can be selected to minimize the adhesion of sludge and other semi-solids thus increasing filter life, to reduce the pressure drop across a coalescer fuel/water separator or other coalescer, and to achieve other desirable performance characteristics.

In macrostructure A, the nanofibers are distributed uniformly throughout the media matrix. The media is made using conventional wet-laid processes using a mixture of nanofibers and coarse fibers. In some embodiments, short nanofibers less than 1 cm are used. In other embodiments, it may be desirable to use longer nanofibers, including for the macrostructures A and B, to better bridge coarse fiber pores and strengthen the media. On a macro scale, the local filtration properties do not vary significantly with spatial location. The net effect is a significantly higher efficiency, lower pressure drop, and longer life and higher capacity than comparable filters.

In macrostructure B, the nanofibers are distributed unevenly throughout the media matrix. The nanofibers are concentrated in bundles or patches or pockets throughout the matrix. A preferred production process uses islands-in-the-sea technology, noted below. This results in spatially distinct areas of greater and lesser filtration efficiency within the matrix. Due to the low concentration and small diameter of the nanofibers, relative flow velocities through the various sections change as the nanofiber bundles begin to plug. As this occurs, flow will be increasingly diverted through the coarse fiber sections 48 between the pockets 42 of nanofibers. The net effect is overall higher efficiency as compared to filters made only of coarse fibers, and longer life as compared to other filters using nanofiber layers for high efficiency.

In macrostructure C, nanofibers are produced using islands-in-the-sea (IITS) technology, segmented-pie (SP) technology, electrospinning, or the like, and concentrating the nanofibers near the surface of filter media made from the coarse fibers. The noted processes are known in the prior art, and reference may be had to: "*Advances in Sub-Micron Fiber Production*", John Hagewood, Arnold Wilkie, *NonWovens World*, April-May 2003, pages 69-73; "*The microfibre business in Japan*", Max Golding, *Technical Textiles International*, May 1992, pages 18-23, Elsevier Science Publishers 1992. In some embodiments, short nanofibers less than 1 cm in length are used. In further embodiments, even shorter nanofibers in the millimeter range are used. The noted processes produce nanofibers, but not necessarily short ones. Accordingly, it may be necessary to chop or otherwise shorten the nanofibers so produced. Each of the IITS and SP technologies uses a carrier for the fibers, typically provided by a sea polymer carrier. By using a sea polymer carrier that is slow-dissolving, relatively well dispersed nanofibers are provided across the surface of the base media, resulting in nanofibers with a more random, three dimensional orientation, with some nanofiber portions 62 oriented normal to the media face surface 52, rather than a flat two-dimensional orientation with all fibers parallel to media face surface 52. The noted three-dimensional orientation results in increased surface area, better cleanability, and reduced delamination risk of a nanofiber layer.

A benefit of the disclosed structures, particularly macrostructures A and B, is that the incorporation of the nanofibers into the internal structure of the media provides structural support for the nanofibers. In macrostructure C, the internally incorporated structure and the random orientation of the nanofibers, including the three-dimensional orientation, minimizes delamination. In all macrostructures A, B, C, more nanofiber per unit media face area can be used as compared to conventional nanofiber layer media, with less of a pressure drop or capacity penalty. This is particularly advantageous in that nanofibers can be used to increase the surface area of the media for adsorption applications. It has been found that a small amount of nanofibers boosts efficiency with minimal pressure drop, $\Delta P$, penalty, to be described. The internally incorporated structure increases removal efficiency of very small particles, e.g. less than five microns, relative to large particle removal. The structure provides increased adsorption and catalytic activity per unit volume. The structure further provides improvements in strength and processability of the media. In microstructure 1, nanofibers 32 serve as the noted bridges 78 across pores 80 formed by the coarse fibers 36, giving rise to even smaller pores such as 88, 90 having sides formed by a mix of the coarse fibers 36 and nanofibers 32. In microstructure 2, nanofibers 82 collapse onto the coarse fibers 36 and the fiber interstices 96, producing the noted artificially roughened collection surface with increased surface area relative to the coarse fibers alone, and also strengthening the overall media structure, e.g. higher Mullen burst strength, reducing the amount of resin binder needed to finish the media.

As noted above, the nanofibers can be chosen with different triboelectric properties relative to the coarse fibers in order to use a triboelectric effect to enhance particle removal. The use of triboelectric effect is of greatest benefit when the nanofibers are formed by electrospinning. With this method, the generated nanofibers are formed in an electrical field and are less subject to contamination by chemicals that may moderate the triboelectric effect. Nanofibers with different adsorption properties or surface charge characteristics than the coarse fibers can also be used, e.g. in oil or water filtration. This difference can be used to enhance or create localized electrical field gradients within the filter media to enhance particle removal. The nanofibers and coarse fibers can be of different wetting characteristics, as noted above.

In the various macrostructures and microstructures, it is preferred that the lengths of the nanofibers be short enough for incorporation into the structure, but long enough to bridge pores 80 between the coarse fibers or connect adjacent coarse fibers. During initial development, it was preferred that the length of the nanofibers be less than 1 cm. In continuing development, it has been found that the length of the nanofibers for macrostructures A and B need not be less than 1 cm, and in fact lengths greater than 1 cm may be desirable in order to better bridge coarse fiber pores 80 and strengthen the media. It was initially thought that the short length less than 1 cm was needed in order to fit in the bundles 42. However, it has since been found that the nanofibers can wrap or clump together in the bundles 42 in a relatively compact package, even with nanofiber lengths greater than 1 cm. If the nanofiber length is too short, the nanofibers cannot span pores 80 in microstructure 1, FIG. 4. In macrostructure C, it is still preferred that the nanofibers have a short length less than 1 cm, and in some embodiments substantially shorter than 1 cm, e.g. in the millimeter range.

The above noted IITS and SP technologies are bi-component technologies, initially providing a precursor bi-component fiber which is reduced to a nanofiber upon removal of the sea or carrier polymer, as is known. A bi-component fiber is a fiber having two different polymer constituents, one of which is removed, e.g. by a solvent, which may be heated, leaving behind the nanofiber. The bi-component fiber is initially a precursor fiber, typically coarse. The above noted electrospinning process produces the nanofibers directly, without the intermediate step of a precursor bi-component fiber. In some cases, the nanofibers, including the precursor bi-component fibers if used, should be well dispersed prior to forming the composite filter media, and should be blended with coarse fibers 36. If precursor bi-component fibers are used, then appropriate solvents or processes should be used to remove the sea polymer carrier from the parent IITS or SP fiber to create the nanofibers. During production, the nanofibers, including the precursor bi-component fibers if used, may need to be shortened, particularly if short lengths less than 1 cm are desired for macrostructure C, or to a desired length greater than 1 cm in preferred embodiments of macrostructures A and B. The nanofibers, including bi-component fibers if used, may tend to clump together, and may need to be separated and dispersed prior to or upon addition to the coarse fibers 36.

If the potential energy barrier of interaction between the nanofibers and coarse fibers 36 as calculated using DLVO (Derajaguin, Landau, Verwey, Overbeek) theory is low, the nanofibers will tend to wrap around larger fibers and/or aggregate at fiber interstices such as 92, making it difficult to obtain microstructure 1, FIG. 4, without better dispersion/mixing of fibers. The low potential energy barrier instead produces microstructure 2, FIG. 5. To produce microstructure 1, enhanced dispersion or blending of the nanofibers is desired. This is achieved by increasing the potential energy barrier of interaction between the nanofibers and coarse fibers 36 by adjusting the pH of the dispersion fluid, or by adding surfactants or other dispersants, or by adding adsorbing ions to increase the electrical double layer repulsion between fibers, or by altering the wetting characteristics of the fluid or the fibers. Upon removal of solvent or dispersal liquid during drying or curing, nanofibers may collapse onto larger fibers 36, making it difficult to obtain microstructure 1. As noted, this collapsing of the nanofibers may be reduced or controlled by altering or controlling the potential energy barrier of interaction between the nanofibers and coarse fibers 36 using the chemistry of the dispersion as noted. Further alternatively, the noted collapsing may be reduced by increasing the length of the nanofibers. Resin binders may be added to strengthen the media and bind the nanofibers and coarse fibers 36 together.

When using the noted precursor bi-component fibers, e.g. the IITS or SP technologies, the solvent or process for removal of the sea polymer carrier should be compatible with the coarse fibers 36. Once the sea polymer carrier is gone, the remaining nanofibers need to be separated from one another if microstructure 1 is desired, and prevented from clumping onto each other and from clumping/wrapping around coarse fibers 36. As noted, this can be achieved by increasing the potential energy barrier of interaction between the nanofibers and coarse fibers 36 by adjusting the pH of the dispersion fluid, by adding surfactants or other dispersants, by adding adsorbing ions to increase the electrical double layer repulsion between fibers, or by altering the wetting characteristics of the fluid or the fibers.

In macrostructure A, the nanofibers are distributed essentially as individual fibers, relatively uniformly throughout the media, in all three dimensions. The nanofiber/coarse fiber interfaces or associations are provided by microstructure 1 or microstructure 2 or microstructure 3 or a combination thereof.

Figure 7:
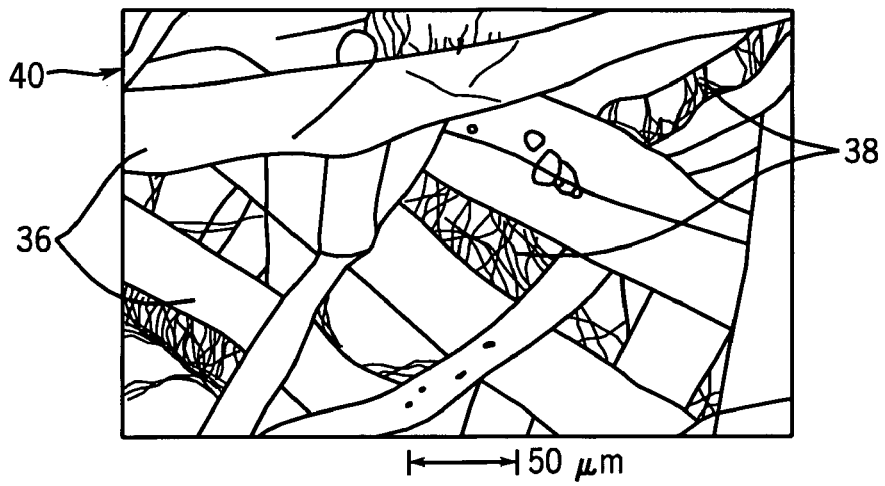
FIG. 7 is a microphotograph of filter media in accordance with the invention.
Figure 9:
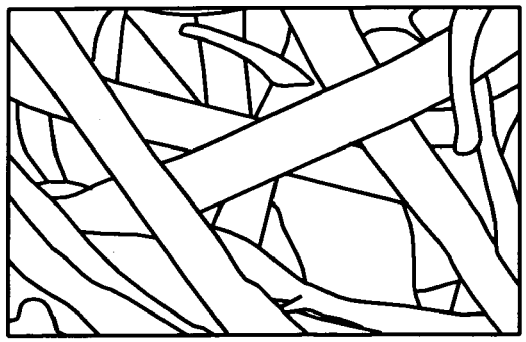
FIG. 9 is a microphotograph of a test media sample.
Figure 10:
FIG. 10 is like FIG. 9 and shows another test media sample.
Figure 11:
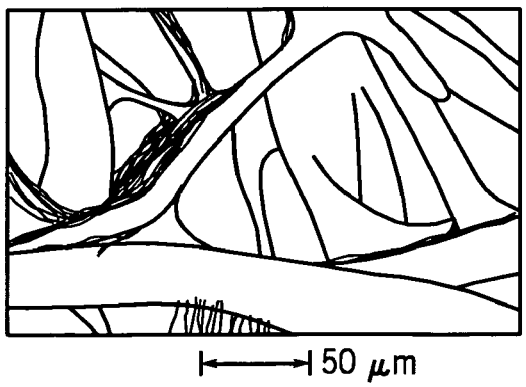
FIG. 11 is like FIG. 9 and shows another test media sample.
Figure 12:
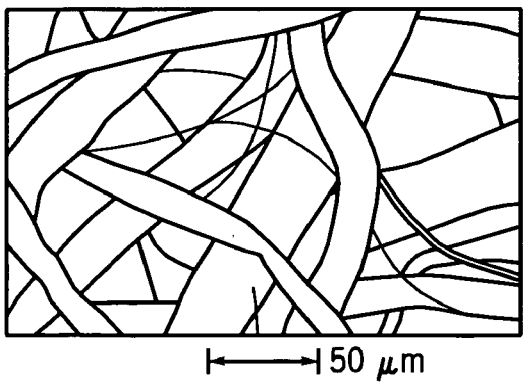
FIG. 12 is like FIG. 9 and shows another test media sample.

Macrostructure B may be produced from bulk nanofiber. This is done by chopping bulk nanofiber, e.g. formed by electrospinning, into appropriate shorter lengths, then mixing the chopped nanofibers in small amounts, typically less than 1% of total media mass, with an aqueous suspension containing the coarse fibers, then dispersing the resultant suspension by mixing and, if needed, the use of dispersants, such that the nanofibers largely remain present as bundles, and then removing the dispersing fluid, e.g. filtering the suspension through a supporting screen, and then drying the media. An example of media produced in this manner is shown in FIG. 7, which is a microphotograph at magnification 500× and includes a scale line showing a 10 μm length. Binders and/or resin may be applied to the media at appropriate steps to increase the strength of the media.

Media with macrostructure B may alternatively be produced using bi-component fibers, e.g. produced by the noted IITS or SP processes, that, upon removal of the sea polymer carrier, results in bundles of nanofibers. Typically, the following steps are performed: the length of the bi-component fiber is reduced, if it has not already been done so, by means of chopping or other processes; small amounts, typically less than 5% of total fiber mass, of shortened bi-component fibers are mixed with coarse fibers to form a suspension; the suspended fibers are mixed and dispersed, using an appropriate mixing device, with or without dispersants; the dispersing fluid is removed, typically by filtering the suspension through a supporting screen; the sea polymer carrier of the bi-component fibers is removed by means of a change in fluid temperature or through the use of a solvent, which may be done before, during or after the dispersing fluid removal step; the media is dried; and binders and/or resin may be applied to the media at the appropriate step to increase the strength of the media, wherein the binder may be applied as part of the dispersing fluid, or separately following fluid or carrier removal.

In macrostructure C, the nanofibers are randomly-three-dimensionally oriented, and do not lie solely flat in a two-dimensional plane. This random three-dimensional orientation has significant advantages, including: increased strength of attachment of the nanofiber portion of the media to the coarse fiber portion of the media and reduced delamination risk to which nanofiber layers are otherwise subject; and reduced pressure drop due to increased orientation of nanofibers in the direction of flow 58. Media with macrostructure C may be produced using bi-component fibers, by the following steps: the length of the bi-component fibers may be reduced, if not already been done so, by means of chopping or other processes; the shortened bi-component fibers are dispersed in an appropriate fluid containing dispersants as needed to provide a bi-component fiber suspension; the coarse fibers are dispersed in an appropriate fluid containing dispersants as needed to provide a coarse fiber suspension; the dispersing fluid is removed from the coarse fiber suspension, typically by filtering it through a supporting screen, to provide a coarse fiber web; the bi-component fiber suspension is introduced over the coarse fiber web, which may be done any time after the start of removal of the coarse fiber dispersing fluid, wherein the sooner the introduction, the more intermixed the two types of fibers will be; the dispersing fluid is removed from the bi-component fiber suspension, typically by filtering it through the coarse fiber web; the sea polymer carrier of the bi-component fibers is removed by means of a change in fluid temperature or through the use of a solvent, which may be done before, during or after removal of the dispersing fluid; the media is dried; and binders and/or resin may be applied to the media at the appropriate step to increase the strength of the media, which binder may be applied as part of the dispersing fluid, or separately following fluid or carrier removal.

Figure 13:
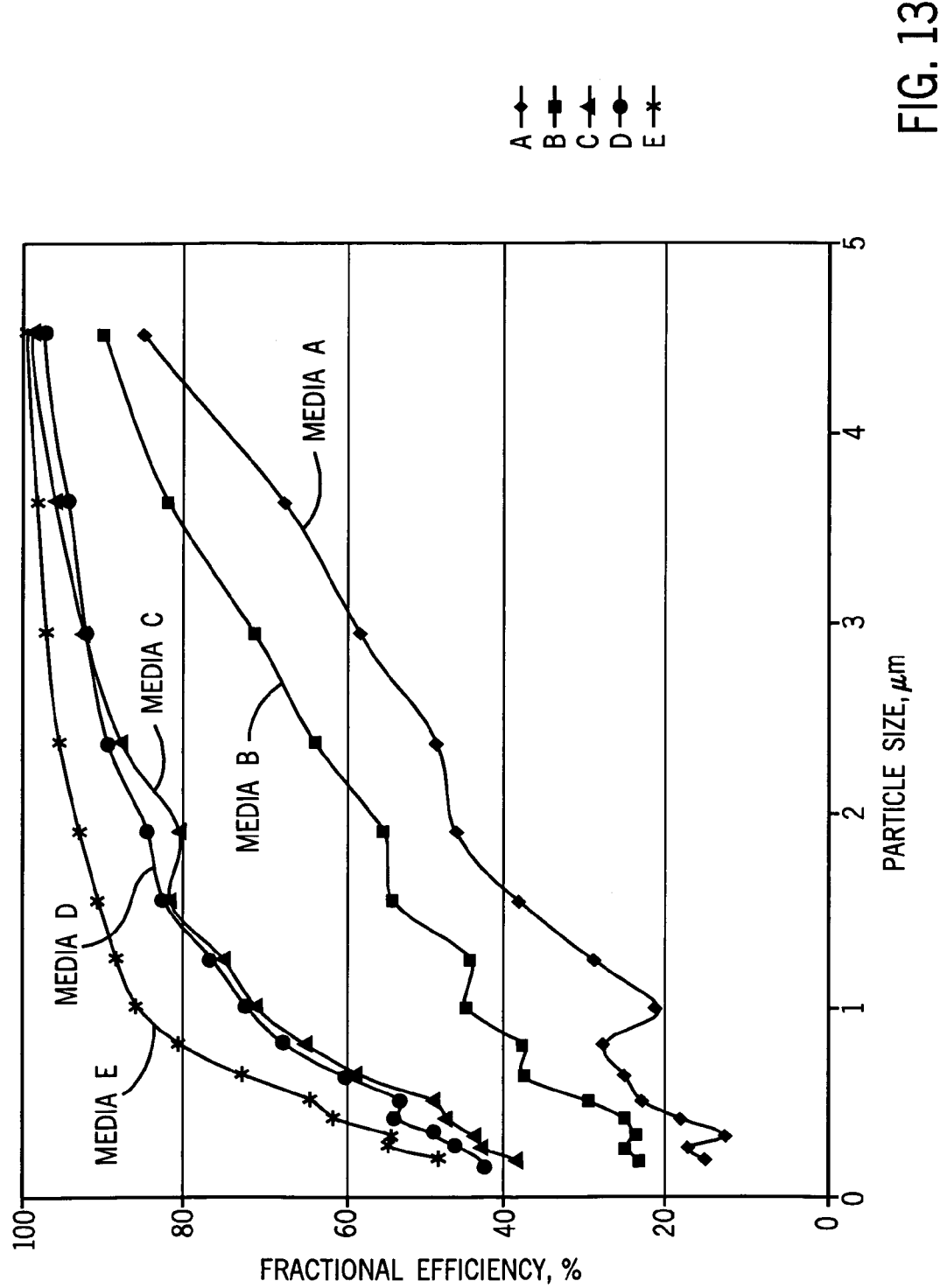
FIG. 13 is a graph of particle size vs. fractional efficiency for test media samples.
Figure 14:
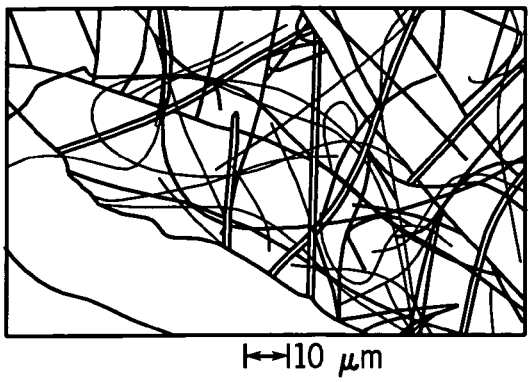
FIG. 14 is a microphotograph of another test media sample.
Figure 15:
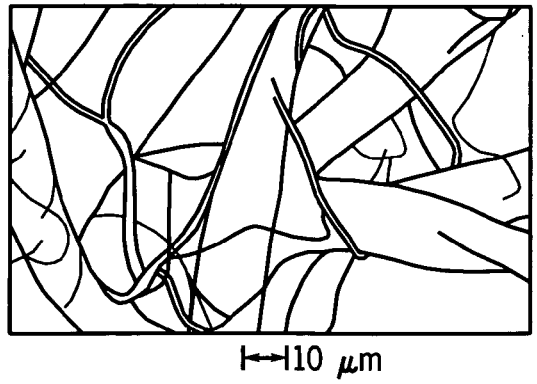
FIG. 15 is like FIG. 14 and shows another test media sample.
Figure 16:
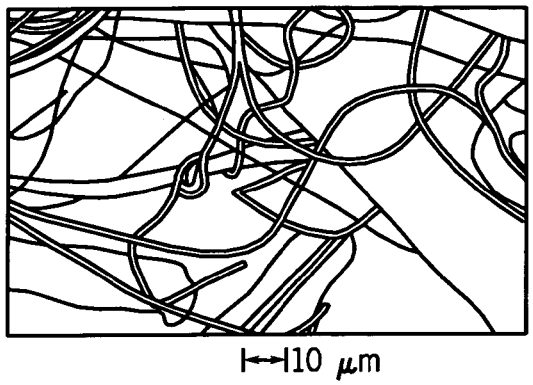
FIG. 16 is like FIG. 14 and shows another test media sample.
Figure 17:
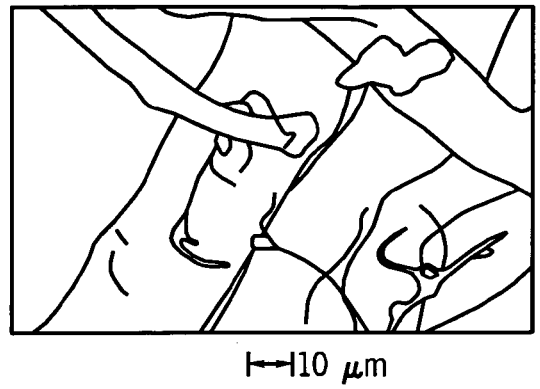
FIG. 17 is like FIG. 14 and shows another test media sample.

A series of samples were made and tested, including five samples for air filter testing, namely media A, media B, media C, media D, media E, Table 1, FIG. 8. All five samples used similar base cellulose fibers and amounts for the coarse fibers, but the type and amount of secondary fibers varied as follows: media A contains no secondary fibers, Table 1 and FIG. 9; media B contains 0.25 grams of 1,400-3,300 nm diameter melt-blown polyester secondary fibers, Table 1; media C contains 1.00 grams of 1,400-3,300 nm diameter melt-blown polyester secondary fibers, Table 1 and FIG. 10; media D contains 0.03 grams of 100-500 nm diameter acrylic secondary nanofibers, Table 1 and FIG. 11; media E contains 0.25 grams of 800 nm diameter glass secondary nanofibers, Table 1 and FIG. 12. The physical properties of the media, as well as their fractional efficiency and pressure drop, are summarized in Table 1. FIGS. 9-12 are microphotographs at 500× magnification and include scale lines showing the noted dimensional length. FIG. 7 shows the upstream face of media D. The nanofibers are present in the noted bundles or localized masses that are dispersed throughout the thickness of the media. Table 1 shows that the five media samples A-E have about the same basis weight and thickness (caliper). The data in the Table shows that: efficiency increased with the addition of secondary nanofibers with smaller diameters than the coarse bulk fibers (pine pulp, cellulose); small amounts of nanofibers used in the internal structure yielded a large efficiency increase relative to the base media; about 30 times more coarse polyester melt-blown fiber on a mass basis was required to achieve the efficiency obtained with the acrylic nanofiber; about 4 to 10 times more coarse fiber polyester melt-blown fiber on a mass basis was required to achieve the efficiency obtained with the glass nanofiber; less nanofiber is needed to obtain the efficiency increase than any of the coarser secondary fibers. A comparison of air filter fractional efficiencies for media samples A, B, C, D, E is shown in FIG. 13. The incorporation of nanofibers into the media internal structure is desirable for increased strength, and a concordant benefit of reducing the amount of binder or resin required to strengthen the media. For this benefit, macrostructures A or B are preferred using well dispersed and relatively long nanofibers, e.g. greater than 1 cm. For purposes of increasing strength, microstructure 2 is preferred, however microstructure 1 also can afford improved strength, particularly if the bundles are relatively porous and intermixed with the coarse fibers.

Another series of five samples were made and tested, namely samples G, H, I, J, K, Table 1, FIG. 8. The properties of these samples were chosen for fuel filter media. All five of these samples used similar base cellulose coarse fibers and amounts, but the type and amount of secondary fibers were varied as follows: media G contains 0.5 grams of 800 nm diameter glass secondary nanofiber, Table 1 and FIG. 14; media H contains 0.5 grams of 500-4,000 nm diameter fibrillated Kevlar secondary fiber, Table 1; media I contains 1.00 grams of 500-4,000 nm diameter fibrillated Kevlar secondary fiber, Table 1 and FIG. 15; media J contains 0.8 grams of 1,400-3,300 nm diameter melt-blown polyester secondary fiber, Table 1 and FIG. 16; media K contains 0.06 grams of 200-600 nm diameter polyaramid secondary nanofiber, Table 1 and FIG. 17. FIGS. 14-17 are microphotographs at magnification 1,000× and include a scale line showing the noted length dimension. As in the case of media samples A through E, only small amounts of nanofiber, relative to the coarse fibers, in media samples G through K are required to obtain significant reductions in mean flow pore size. Media K, having macrostructure B, microstructure 2, was obtained using polyaramid nanofibers. Media G, having macrostructure A, microstructure 1, was obtained by increasing the amount of nanofiber relative to coarse fiber.

Figure 18:
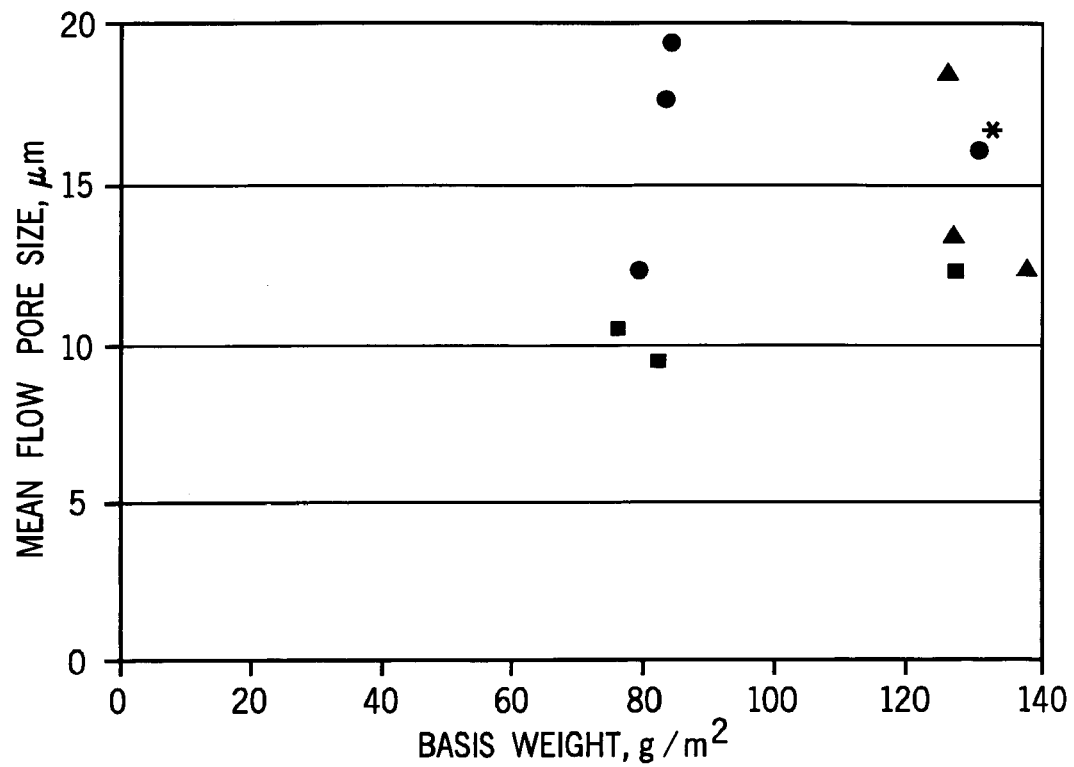
FIG. 18 is a graph illustrating characteristics of the sample filter media of the Table in FIG. 8.

FIG. 18 graphically shows mean flow pore size (MFP) in microns vs basis weight in grams per square meter (g/m$^2$) for the media samples in Table 1. The first set of media samples A-E are comparable to one another in terms of basis weight, namely approximately 80 g/m$^2$. Similarly, the second set of media samples G-K are comparable to one another in terms of basis weight, namely approximately 130 g/m$^2$. In the first set, it is seen that the addition of small amounts of nanofiber greatly decreases MFP without noticeable increase in basis weight. This decrease in MFP concordantly increases particle removal efficiency. In the second set G-K, the addition of nanofibers, e.g. in media G, decreased the MFP relative to a media without nanofibers, e.g. media J, as was observed with the first set of media. However, the addition of nanofibers in media K increased the MFP only to a small degree relative to a media without nanofibers, e.g. media J. This illustrates the significance of microstructure relative to MFP, and hence removal efficiency. Media G is of microstructure 1 in which the nanofibers subdivide the larger pores 80 (formed by the intersection of coarse fibers 36) into smaller pores 88, 90. In contrast, the nanofibers of media K collapsed onto the coarse fibers, microstructure 2, FIG. 5, which did not significantly influence either basis weight or MFP.

Microstructure 2 may be desirable in some applications for improved media strength. Another advantage of microstructure 2 is the ability to increase surface area within the structure without dramatic increase in flow restriction or reduction in average pore size. For example, adding finely divided powders to wet laid media can increase surface area but it is very difficult to retain these materials in the forming process. Nanofiber materials, on the other hand, are easily retained because they entangle with the larger fibers. The nanofibers still add substantial surface area just as a fine nanoscale powder or nanoparticle would. Further, beneficially, the nanoscale fibers may have chemical or catalytic properties, e.g. can be composed of material including catalytic materials, reactive materials, and adsorptive materials.

In comparing media I and media J, it is noted that they are identical in terms of primary cellulosic components, but differ in the use of secondary fibers. Media J uses only secondary microfibers, e.g. diameter 1,400-3,300 nm. Media I uses largely secondary microfibers, with some nanofibers, e.g. most of the diameter range of 500-4,000 nm is secondary microfibers (greater than 1 μm) and a smaller portion of the range includes nanofibers (less than 1 μm). Concordantly, media I has a smaller MFP of 13.4 μm than media J having an MFP of 16.1 μm.

In comparing media G and media H, it is noted that they are identical in terms of primary cellulosic components, but media G uses glass secondary nanofibers, while media H uses largely secondary microfibers, with some nanofibers. Media G exhibits a substantially smaller MFP than media H.

Figure 19:
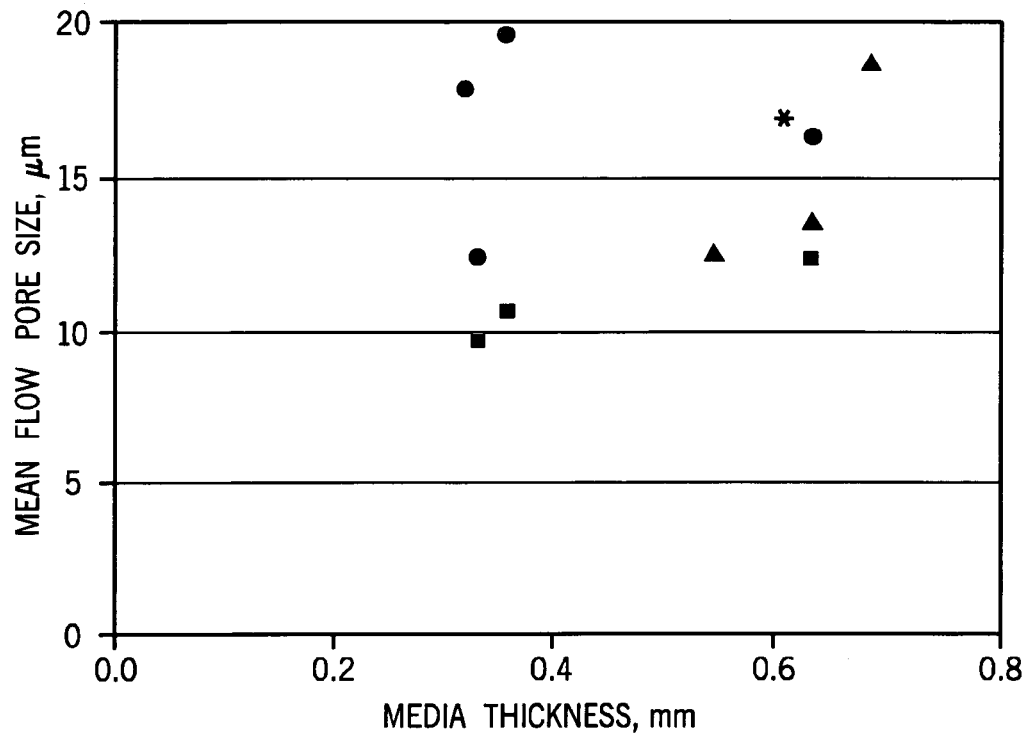
FIG. 19 is another graph illustrating characteristics of the sample filter media of the Table in FIG. 8.

FIG. 19 graphically shows the relationship between mean flow pore size (MFP) in microns and media thickness in millimeters for the media samples in Table 1. In general, the results follow those for basis weight in that the incorporation of nanofibers allows smaller MFP to be obtained for the small media thickness. This is an advantage in filtration because thinner media allows for the use of a greater pleat density, which in turn increases dust holding capacity in filter elements and reduces the fluid face velocity through the filter.

The invention provides desirable methods for manufacturing high performance filter media incorporating and processing nanofibers of diameter less than 1 μm into internal structure of filter media dominantly composed of coarse fibers of diameter greater than 1 μm. The methods may use an electrospinning process, as above noted, to directly provide the nanofibers, or may use a bi-component processing technology, such as IITS or SP as noted above, to provide the nanofibers through an intermediate step with precursor bi-component fibers using a carrier, e.g. a sea polymer carrier.

In one embodiment, the filter media is produced using coarse fibers and bi-component fibers. The bi-component fibers are produced by the IITS process using a water soluble sea polymer and a water insoluble island polymer. Water is used as the carrier to disperse and suspend the bi-component fibers and the coarse fibers 36 to provide wet media, and as the solvent for the sea polymer to dissolve the sea polymer upon heating the wet media. The sea polymer is the carrier for the island polymer, which later provides the nanofibers, as is known. The water is the carrier for the bi-component fibers and the coarse fibers 36, as well as the solvent for the sea polymer. For example, a water soluble polymer, such as polyvinyl alcohol or polyethylene oxide may be used as the carrier or sea polymer, while a water insoluble island polymer, such as polyester or nylon, may be used as the island or nanofiber polymer. The heating step is performed as a separate hot rinsing step. Alternatively, the heating step is performed by applying heat during the drying. Further alternatively, hot water is applied to the media, and the hot water is removed by vacuuming or draining, and then applying heat to dry the media, and using such applied heat as the heating step. The heating step is performed by increasing the temperature of the water and/or the media to dissolve the sea polymer, leaving nanofibers behind and retained in the filter media.

In another embodiment, the filter media is produced with the IITS process, and the sea polymer carrier is dissolved with a phenolic resin solvent. In a further embodiment, the sea polymer carrier is dissolved with a water-based resin, preferably an acrylic and/or water-based phenolic resin. Heat may be applied to cure the resin, and such heat may be used to facilitate dissolution of the sea polymer carrier.

In desirable manufacturing implementations, the filter media is produced with a bi-component process having a carrier and initially providing precursor bi-component fibers which are reduced to nanofibers upon removal of the carrier, wherein the bi-component fibers are added to the coarse fibers prior to removal of the carrier. The carrier is dissolved with a solvent, and preferably the solvent is heated. In the case of macrostructure C, the dispersed bi-component fibers are applied across the face of the media without the need for electrospinning.

In a further embodiment, a trimodal distribution of fiber diameter may be provided, including a first set of fibers 32, FIG. 4, in the diameter range 50 to 500 nm, a second set of fibers as shown in dashed line at 98 in the diameter range 1 to 5 μm, and a third set of fibers 36 in the diameter range 10 to 50 μm. The first set of fibers is supported by the second set of fibers, and the second set of fibers is supported by the third set of fibers. The first set of fibers provides the nanofibers. The second and third sets of fibers provide the coarse fibers. In one particular embodiment, the first set of fibers form bridges across pores between the second set of fibers without substantial collapse onto the second set of fibers, and the first set of fibers are provided by acrylic nanofibers, the second set of fibers are provided by a fibrillated para-aramid polymer, and the third set of fibers are a cellulose matrix.

Figure 20:
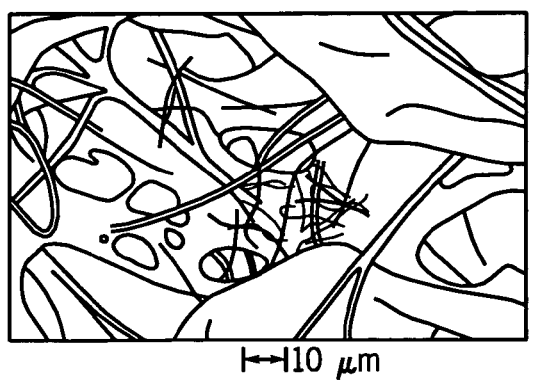
FIG. 20 is like FIG. 14 and shows prior art.

In a further embodiment, the noted manufacturing methods enable production of filter media with glass as well as flexible non-glass nanofibers, in contrast to prior filter media. Table 1 in FIG. 8 shows in the right-most column a commercial fuel filter grade cellulose filter media (CF) known in the prior art and having rigid glass nanofibers. FIG. 20 is a microphotograph at 1,000× magnification of the commercial fuel grade cellulose media (CF) known in the prior art and includes a scale line showing the noted length dimension. The structure of the fibers in FIG. 20 is a hybrid between microstructures 1 and 2, in that some of the secondary fibers bridge larger pores while others have collapsed. The CF media uses a phenolic resin binder, and, in addition to the primary coarse cellulosic components, it contains a mixture of nanofibers and microfibers. The macrostructure of media CF is similar to macrostructure A and relies upon stiff glass fibers to achieve such macrostructure.

The present system can use glass nanofibers and can additionally or alternatively use flexible polymeric, e.g. acrylic, nanofibers to achieve macrostructure A. To achieve macrostructure A with flexible nanofibers, a significant aspect is to create a stable suspension of the fibers that does not encourage clumping, aggregation or collapse onto the coarse fibers 36. This may be done by altering the solvent environment, adjusting the pH of the suspending medium, or the use of surfactants or other additives to increase the surface charge on the nanofibers, as above described. The CF media uses polymeric microfibers to strengthen the media. In contrast, for example with reference to sample K, and the use of appropriate nanofiber material, e.g. polyaramid, smaller amounts of nanofiber can instead be used. In the various embodiments of the present invention, bi-component nanofiber technology, e.g. IITS or SP, may be used to produce coarse bi-component fibers that can be mixed in with the coarse bulk fibers 36, and then removal of the sea polymer carrier to produce a high surface area filter media with incorporated nanofibers. For example, a bi-component fiber consisting of a water soluble sea or carrier polymer, such as polyvinyl alcohol or polyethylene oxide, and a water insoluble island or nanofiber polymer, such as polyester or nylon, may be added to a suspension of water insoluble coarse fiber, such as polyester, acrylic, cellulose. The present methodology is particularly useful for producing macrostructures B and C, and enables several alternative methods for producing the filter media containing nanofibers. In one method, when a water soluble sea polymer carrier is used, and water is used as the carrier to disperse/suspend the fibers during the production of the filter media, and dissolution of the sea polymer can be accomplished by heating the wet media. This may be done as a separate hot rinsing step or using the heat applied to dry the media while vacuuming or draining off the hot water. In either case, the temperature of the water and/or media is increased and the sea polymer carrier dissolves, leaving nanofibers behind that are retained within the media matrix. In another method, when a solvent-based phenolic resin system is used to hold the fibers together, the solvent for the resin system can be used to dissolve the sea polymer carrier, eliminating the need for an additional processing step or additional chemicals. In another method, when a water-based resin system is used, such as acrylic and/or water-based phenolic, to hold the fibers together, the water for the resin system can be used to dissolve the sea polymer carrier, eliminating the need for an additional processing step. Heat applied to cure the resin system facilitates dissolution of the sea polymer. In order to more uniformly distribute the nanofibers, the bi-component fibers can be added to the coarse fibers during or before pulping operations and the carrier water used to dissolve the water-soluble sea polymer. Heat may be applied to facilitate this. In a desirable aspect in production of macrostructure C, the invention enables the use of a dual or multiple head box hopper, as known in the prior art, to apply dispersed bi-component fibers. The sea polymer carrier can then be removed using one of the above methods. This allows the production of nanofiber filter media without having to create and apply the nanofibers by electrospinning them onto a substrate.

It is recognized that various equivalents, alternatives and modifications are possible within the scope of the appended claims.

What is claimed is:

1. A method for manufacturing high performance filter media comprising incorporating and processing nanofibers of diameter less than 1 μm into internal structure of a filter media dominantly composed of coarse fibers of diameter greater than 1 μm, producing said filter media with a bi-component fiber process having a carrier initially providing a precursor bi-component fiber which is reduced to a nanofiber upon removal of said carrier, wherein said precursor bi-component fiber process is selected from the group consisting of islands-in-the-sea and segmented-pie processes.

2. The method according to claim 1 comprising producing said filter media using said coarse fibers and said bi-component fibers, producing said bi-component fibers with said islands-in-the-sea process having a sea polymer as a carrier for an island polymer to provide said nanofibers upon removal of the sea polymer carrier, using a water soluble sea polymer and a water insoluble island polymer, using said water as a carrier to disperse and suspend said bi-component fibers and said coarse fibers to provide wet media and to provide a solvent for the sea polymer such that the water is the carrier for said bi-component fibers and said coarse fibers as well as the solvent for the sea polymer.

3. The method according to claim 2 comprising dissolving the sea polymer by heating the wet media.

4. The method according to claim 3 comprising performing said heating step as a separate hot rinsing step.

5. The method according to claim 3 comprising drying said wet media, and performing said heating step by applying heat during said drying.

6. The method according to claim 3 comprising applying hot water to said media, removing said hot water by a step selected from the group consisting of vacuuming and draining, and applying heat to dry the media and using such applied heat as said heating step.

7. The method according to claim 3 comprising performing said heating step by increasing the temperature of said water and said media to dissolve said sea polymer, leaving said nanofibers behind and retained in said filter media.

8. The method according to claim 1 comprising producing said filter media with said islands-in-the-sea process having a sea polymer as said carrier, and dissolving said sea polymer with a solvent comprising phenolic resin.

9. The method according to claim 1 comprising producing said filter media with said islands-in-the-sea process having a sea polymer as said carrier, and dissolving said carrier with a solvent comprising a water-based resin.

10. The method according to claim 9 wherein said water-based resin system is selected from the group consisting of acrylic and water-based phenolic resin.

11. The method according to claim 9 comprising applying heat to cure said resin, and using said heat to facilitate dissolution of said sea polymer.

12. A method for manufacturing high performance filter media comprising incorporating and processing nanofibers of diameter less than 1 μm into internal structure of a filter media dominantly composed of coarse fibers of diameter greater than 1 μm, producing said filter media with a bi-component fiber process having a carrier and initially providing precursor bi-component fibers reduced to nanofibers upon removal of said carrier, and comprising adding said precursor bi-component fibers to said coarse fibers prior to removal of said carrier.

13. The method according to claim 12 comprising dissolving said carrier with a solvent, and heating said solvent.

14. The method according to claim 12 wherein said filter media has distally opposite upstream and downstream faces normal to flow therethrough and defining a filter media thickness therebetween, and said filter media has a macrostructure C, defined as viewed at magnification of 5 to 50×, wherein said nanofibers are concentrated at one of said faces, and comprising applying dispersed said precursor bi-component fibers across said one face.

15. The method according to claim 12 comprising separating said nanofibers formed by dissolution of said carrier from said precursor bi-component fibers by a step selected from the group consisting of: adjusting pH; adding dispersant; adding ions; altering wettability.

16. The method according to claim 12 wherein said filter media has distally opposite upstream and downstream faces normal to flow therethrough and defining a filter media thickness therebetween, and said filter media has a macrostructure C, defined as viewed by magnification of 5 to 50×, wherein said nanofibers are concentrated at one of said faces, and comprising using said precursor bi-component fibers to create said macrostructure C.

17. The method according to claim 16 comprising using heat to remove said carrier.

18. A method for manufacturing high performance filter media comprising incorporating and processing nanofibers of diameter less than 1 μm into internal structure of a filter media dominantly composed of coarse fibers of diameter greater than 1 μm, producing said filter media with a macrostructure B having said nanofibers distributed unevenly in bundles providing pockets of nanofibers in a matrix of said coarse fibers.

19. A method for manufacturing high performance filter media comprising incorporating and processing nanofibers of diameter less than 1 μm into internal structure of a filter media dominantly composed of coarse fibers of diameter greater than 1 μm, wherein said filter media has distally opposite upstream and downstream faces normal to flow therethrough and defining a filter media thickness therebetween, and comprising producing said filter media with a macrostructure C having said nanofibers concentrated at one of said faces.

20. A method for manufacturing high performance filter media comprising incorporating and processing nanofibers of diameter less than 1 μm into internal structure of a filter media dominantly composed of coarse fibers of diameter greater than 1 μm, producing said filter media with a microstructure 1 having said nanofibers forming bridges across pores between said coarse fibers.

21. A method for manufacturing high performance filter media comprising incorporating and processing nanofibers of diameter less than 1 μm into internal structure of a filter media dominantly composed of coarse fibers of diameter greater than 1 μm, producing said filter media with a microstructure 2 having said nanofibers substantially collapsed onto said coarse fibers.

22. A method for manufacturing high performance filter media comprising incorporating and processing nanofibers of diameter less than 1 μm into internal structure of a filter media dominantly composed of coarse fibers of diameter greater than 1 μm, producing said filter media with a microstructure 3 having no significant bridging of said nanofibers across pores between said coarse fibers, and no significant collapsing of said nanofibers onto said coarse fibers, and instead with clumping of said nanofibers together.

23. A method for manufacturing high performance filter media comprising incorporating and processing nanofibers of diameter less than 1 μm into internal structure of a filter media dominantly composed of coarse fibers of diameter greater than 1 μm, producing said filter media with a bi-component fiber process having a carrier initially providing a precursor bi-component fiber which is reduced to a nanofiber upon removal of said carrier removing said carrier to yield bundles of nanofibers providing a macrostructure B having said nanofibers distributed unevenly in said bundles providing pockets of nanofibers in a matrix of said coarse fibers.

24. The method according to claim 23 comprising reducing the length of said precursor bi-component fibers to a desired length providing shortened bi-component fibers, providing said shortened bi-component fibers as less than 5% by weight of the weight of said filter media, mixing said bi-component fibers with said coarse fibers to form a suspension in a dispersing fluid, removing said dispersing fluid, removing said carrier by a change in fluid temperature or by a solvent, before, during or after the step of removing the dispersing fluid, drying the media, and adding a binder or resin at a designated step as part of the dispersing fluid or separately following fluid or carrier removal.

25. A method for manufacturing high performance filter media comprising incorporating and processing nanofibers of diameter less than 1 μm into internal structure of a filter media dominantly composed of coarse fibers of diameter greater than 1 μm, producing said filter media with a bi-component fiber process having a carrier initially providing a precursor bi-component fiber which is reduced to a nanofiber upon removal of said carrier, wherein said filter media has distally opposite upstream and downstream faces normal to flow therethrough and defining a filter media thickness therebetween, and comprising using said precursor bi-component fibers to produce filter media with a macrostructure C having said nanofibers concentrated at one of said faces.

26. The method according to claim 25 comprising reducing the length of said precursor bi-component fibers to a desired length providing shortened bi-component fibers, dispersing said shortened bi-component fibers in a fluid containing dispersants as needed to provide a bi-component fiber suspension, dispersing said coarse fibers in a fluid containing dispersants as needed to provide a coarse fiber suspension, removing the dispersing fluid from the coarse fiber suspension to provide a coarse fiber web, introducing the bi-component fiber suspension over the coarse fiber web at a time after the start of removal of the coarse fiber dispersing fluid, removing the dispersing fluid from the bi-component fiber suspension, removing said carrier by a change in fluid temperature or by a solvent, before, during or after removal of the dispersing fluid for the bi-component fibers, drying the media, applying a binder or resin to the media at a designated step as part of the dispersing fluid or separately following fluid or carrier removal.

* * * * *